United States Patent [19]

Weide et al.

[11] Patent Number: 4,828,622

[45] Date of Patent: May 9, 1989

[54] PROCESS FOR PREPARING HIGHLY CONCENTRATED AQUEOUS PRESS CAKES OF SOLIDS

[75] Inventors: Joachim Weide; Erwin Dietz, both of Kelkheim; Reinhold Deubel, Bad Soden am Taunus, all of Fed. Rep. of Germany

[73] Assignee: Hoechst Aktiengesellschaft, Frankfurt am Main, Fed. Rep. of Germany

[21] Appl. No.: 191,808

[22] Filed: May 5, 1988

Related U.S. Application Data

[63] Continuation of Ser. No. 795,206, Nov. 5, 1985, abandoned.

[30] Foreign Application Priority Data

Nov. 6, 1984 [DE] Fed. Rep. of Germany ....... 3440488

[51] Int. Cl.$^4$ ............................................. C09B 67/50
[52] U.S. Cl. ................................... 106/412; 106/400; 106/401; 534/887
[58] Field of Search ................. 106/400, 401, 412; 534/887

[56] References Cited

U.S. PATENT DOCUMENTS

| 3,804,824 | 4/1974 | Kaiser et al. | 534/887 |
|---|---|---|---|
| 3,841,888 | 10/1974 | Belde et al. | 534/887 |
| 3,998,652 | 12/1976 | Aign et al. | 534/887 |
| 4,117,066 | 9/1978 | Mollef et al. | 534/820 |
| 4,607,096 | 8/1986 | Landler et al. | 534/887 |

FOREIGN PATENT DOCUMENTS

| 1158384 | 2/1979 | Canada . |
|---|---|---|
| 17189 | 10/1980 | European Pat. Off. . |
| 0074670 | 3/1983 | European Pat. Off. . |
| 2156603 | 6/1976 | Fed. Rep. of Germany . |
| 2421606 | 1/1977 | Fed. Rep. of Germany . |
| 2730223 | 1/1979 | Fed. Rep. of Germany . |
| 3026127 | 2/1982 | Fed. Rep. of Germany . |
| 208477 | 5/1984 | Fed. Rep. of Germany . |
| 2269991 | 12/1975 | France . |
| 099336 | 7/1980 | Japan . |
| 051280 | 3/1984 | Japan . |

OTHER PUBLICATIONS

Kataoka et al., Chem. Abs. 93:1696206 (1980).
Mitsubishi Chemical Industries, Chem. Abs. 101:72598c, (1984).
Chem. Abs. 94:17058p (1981), corresp. to Japanese Pat. Pub. 80/104358 (Aug. 1980).
Kataoka et al, Chem. Abs. 93:169620h (1980), corresp. to Japanese Pat. Pub. 80/99,336 (Jul. 1980).

*Primary Examiner*—Prince E. Willis
*Assistant Examiner*—Willie J. Thompson

[57] ABSTRACT

According to the invention, addition of one or more surfactants having a cloud point in aqueous solution to an aqueous suspension of a solid gives after the isolation of the solid at a temperature above the cloud point aqueous press cakes containing a large amount of this solid. The direct processing of press cakes as obtained for example after the synthesis and isolation of dyes or pigments to give practical aqueous pastes or dispersions requires a minimum solids content in the press cakes. The minimum content is frequently not obtained when conventional methods of isolation are used, so that it is necessary to proceed via the indirect route of drying to obtain the powders and redispersing the powders. By using the process according to the invention it is possible to cut out the costly indirect route or, if desired, to reduce the expense of drying to obtain powders by an appreciable margin.

15 Claims, No Drawings

PROCESS FOR PREPARING HIGHLY CONCENTRATED AQUEOUS PRESS CAKES OF SOLIDS

This application is a continuation of Ser. No. 795,206, filed Nov. 5, 1985, now abandoned.

The invention relates to a process for preparing highly concentrated aqueous press cakes of water-insoluble or sparingly water-soluble solids, in particular of sparingly water-soluble or water-insoluble dyes and pigments.

Many colorants, for example the particularly important azo dyes or azo pigments, are synthesized in an aqueous medium and are isolated from the reaction mixture by filtration or pressoff and, if necessary, are purified by washing away byproducts. The results obtained are press cakes having solids contents of around 10 to 30%, which are subsequently dried or used as such. Since the drying of aqueous press cakes is very costly in energy terms, it is desirable to prepare press cakes which are as concentrated as possible. This can be done for example by employing costly hardware in the form of membrane high-pressure filter presses or sieve cone mixers.

If the solids are to processed into the form of aqueous pastes, as is frequently the case with dyes or pigments, this too usually requires a drying step, since the low solids content of the press cakes does not permit a practical colorant concentration in the pastes.

However, both the necessary drying and the higher dispersing effort required for the dispersing of powders are the cause of appreciable costs. The desire for a simple method of preparing highly concentrated aqueous press cakes is clear from the requirements mentioned and is met by the present invention.

The invention consists in a process for preparing highly concentrated aqueous press cakes of water-insoluble or sparingly water-soluble solids, which comprises preparing an aqueous suspension of the respective solid containing one or more nonionic surfactants which have a cloud point in aqueous solution and isolating the solid at a temperature above the cloud point of the surfactant(s) used.

The solids contents of the press cakes obtained depend on the surfactant, on the amount of surfactant, on the solid and more specifically on the surface area of the solid. A suitable nonionic surfactant or surfactant mixture must have a cloud point in aqueous solution and at temperatures above the cloud point substantially lose its hydrophilicity, so that two layers form in water as a result of phase separation. The cloud point of the surfactant(s) in water is preferably between 5° and 90° C., in particular between 20° and 70° C. The stated temperatures are applicable to working under atmospheric pressure. The required amount of surfactant depends on the surface area of the respective solid. The amount is preferably between 0.5 and 15 mg, particularly preferably between 1 and 6 mg, per square meter of surface area of the solid. As a rule, as the amount of surfactant increases, the solids content of the press cakes passes through a maximum.

At the start of the process it is necessary to obtain a uniform mixture of the surfactant with the solid in aqueous suspension. This can be effected by adding the surfactant to an aqueous suspension of the solid and stirring thoroughly. In other cases it is possible to precipitate the solid from an aqueous solution in the presence of the surfactant, more rapid mixing being obtained. Both procedures can be carried out at a temperature above and below the cloud point. However, preferably the surfactant is mixed with the solid at a temperature below the cloud point. While stirring, the surfactant-containing aqueous suspension of the solid is subsequently brought to a temperature above the cloud point. There is generally no need for prolonged stirring at the elevated temperature. The solid is finally isolated at a temperature above the cloud point using customary means, for example sucking off or pressing off by means of filters.

The surfactants can be mixed with any aqueous suspension of an organic solid. The process is preferably used with organic dyes which are synthesized in an aqueous medium. Examples of substrates are sparingly water-soluble dyes, crop protection agents and in particular pigments and disperse dyes.

In the preparation of azo dyes and azo pigments, the surfactant is advantageously added to the coupling suspension after the synthesis. If a solid can be precipitated from an aqueous solution, for example as in the case of many dyes having acid groups by changing the pH, the surfactant is advantageously added to the solution of the dye before the precipitation.

A further advantage of the process is the possibility that, after the isolation of the solid from the hot reaction mixture, soluble byproducts, for example salts, can be washed away with water at a temperature above the cloud point of the surfactant-containing suspension of the solid without significantly affecting the surfactant content.

After the highly concentrated press cakes have been cooled down to a temperature below the cloud point, the dispersing properties of the surfactants become fully effective again. Through the action of small shearing forces, for example in the course of stirring, in many cases a reliquefaction occurs to give pourable and pumpable pastes having high solids contents. Such pastes having a very high solids content can be economically spray-dried to powders. The liquefaction of the press cakes as a result of cooling and the solidification of the press cakes as a result of heating is reversible.

The process can be carried out with a large number of nonionic surfactants having different structures, provided they meet the condition of having a cloud point in water. Nonionic oxyalkylates of alcohols, fatty alcohols, phenols, alkylphenols, naphthols, alkylnaphthols and fatty amines with ethylene oxide and/or propylene oxide and block polymers of ethylene oxide and propylene oxide have been found to be particularly suitable. The temperature of the cloud point of such compounds depends on the length of the polyalkyleneoxy chain and can be varied in the synthesis of the surfactants by the choice of the amount of ethylene oxide and/or propylene oxide used.

Suitable nonionic surfactants are compounds having a poly(ethyleneoxy) chain or a poly(ethyleneoxy)-poly(methylethyleneoxy) chain which are bonded via an oxygen or nitrogen atom to radicals of the following kind: aliphatic or cycloaliphatic alkyl radicals, primary or secondary alkyl radicals having 6 to 26 carbon atoms, particularly alkyl radicals having 10 to 18 carbon atoms chain length, specifically the nonyl, decyl, undecyl, dodecyl, tridecyl, tetradecyl, pentadecyl, hexadecyl, heptadecyl, octadecyl, 2-butyloctyl, 2-pentyloctyl, 2-hexyldecyl, 2-heptyl-undecyl, 2-octyldodecyl, 2-nonyl-tri-decyl, 2-decyltetradecyl, 10-undecenyl, oleyl, (E)-9- octadecenyl, linoleyl or linolenyl radical; aromatic radicals such as the substituted or unsubstituted phenyl or alkyl-phenyl radical having up to three primary or secondary alkyl radicals, preferably the hexylphenyl, heptylphenyl, octylphenyl, nonylphenyl, decylphenyl, undecylphenyl, dodecylphenyl, isononylphenyl, tributylphenyl or dinonylphenyl radical, the phenyl radical substituted by further aromatic radicals, such as the benzyl-p-phenylphenyl radical; naphthyl or alkylnaphthyl radicals, preferably the α-naphthyl or β-naphthyl radical or the alkyl-β-naphthyl radical having 1 to 3 alkyl groups of the type methyl, butyl, octyl, nonyl, decyl, dodecyl or tetradecyl; optionally alkyl-substituted heterocyclic radicals or alkyl radicals substituted thereby, such as, for example, the 2-[2-(8-heptadecen-1-yl)-4,5-dihydro-1-imidazolyl]-ethyl radical.

Preference is also given to mixtures of the abovementioned compounds and in particular mixtures as obtained in the oxyalkylation with ethylene oxide and/or propylene oxide of synthetic fatty alcohols from the oxo synthesis or of fatty alcohols from natural raw materials (after fat splitting and reduction). Examples of natural raw materials are coconut oil, palm oil, cottonseed oil, sunflower oil, soybean oil, linseed oil, rapeseed oil, tallow and fish oil. Also suitable are corresponding fatty amine oxyalkylates from these natural raw materials, in particular cocoa fatty amine, tallow amine and oleylamine.

Also to be mentioned are oxyalkylated, higher-molecular surface-active assistants (surfactants) as described for example in the following patents, Offenlegungsschriften and Auslegeschriften, except those surfactants which have no cloud point in aqueous solutions: DE-A1-2,730,223, DT-B2-2,156,603, DE-A1-3,026,127, DT-B2-2,421,606 and EP-A1-0,017,189.

Which surfactant is used depends on the specific product and on the intended use for the highly concentrated press cakes or powders obtained according to the invention.

Compared with the conventional processes for preparing aqueous press cakes of solids, the use of the process according to the invention gives an improved space-time yield in the filtration of the solids, a saving in drying expenses and a reduced dispersing effort in the processing of highly concentrated prefinished press cakes to aqueous dispersions of the solids. This process is particularly suitable for preparing pigment and dye pastes which are used for coloring materials in aqueous media.

In the following examples, parts and percentages are by weight, unless otherwise stated. Parts by weight relate to parts by volume as the kilogram relates to the liter. The cloud points were determined in accordance with DIN 53917.

EXAMPLE 1

462 parts of 1-acetoacetylamino-2-methoxybenzene were dissolved in 8600 parts of water by addition of 435 parts of 33% strength sodium hydroxide solution. 126 parts of glacial acetic acid were then added. The resultant coupling component had added to it, in the course of 120 minutes, a conventionally prepared diazonium salt solution of 361 parts of 2-methoxy-4-nitroaniline. After the coupling reaction had ended, a suspension of 800 parts of C.I. Pigment Yellow 74, C.I. No. 11741, was present in a coupling volume of 18,000 parts. To this pigment suspension were added at 23° C. 52 parts of coco fatty amine polyglycol ether having a cloud point of 62°–64° C., and the mixture was thoroughly stirred. The mixture was then heated with stirring to 98° to 100° C., was stirred at this temperature for 1 hour, and was cooled down to 80° C., and then the pigment (BET specific surface area: 14 m$^2$/g) was isolated at this temperature via a filter press. The pigment was then washed with hot water at 75° to 80° C. until neutral and salt-free and was blown dry with air in the course of 10 minutes. The resultant pigment press cake had a solids content of 51%.

Comparative example:

The example was repeated without addition of the surfactant. The result obtained was a pigment press cake having a solids content of 25.8%.

EXAMPLE 2

Example 1 was repeated, except that instead of using 52 parts of coco fatty amine polyglycol ether 52 parts of a polymerization product of ethylene oxide and propylene oxide having a cloud point in water of 55° C. were used, affording a pigment press cake having a solids content of 56.5%.

EXAMPLE 3

Example 1 was repeated, except that instead of using 52 parts of coco fatty amine polyglycol ether 52 parts of a nonylphenol polyglycol ether having a cloud point in water of 32°–34° C. were used, affording a pigment press cake having a solids content of 54.51%, which it was possible to process after cooling down to 23° C. and without further additives by means of a dissolver into a fluent and pumpable paste.

EXAMPLE 4

100 parts by weight of C.I. Pigment Blue 61, C.I. No. 42756:1, were dissolved at 90°–100° C. in 2300 parts by weight of water using 20 parts by weight of sodium hydroxide. The hot dye solution had added to it 8 parts by weight of a nonylphenol polyglycol ether having a cloud point in water of 32°–34° C., and the pigment was then precipitated with 160 parts of 18% strength sulfuric acid at a pH below pH 3. The product was sucked off at 70° C. via a porcelain nutsche filter and was washed with hot water at 70° C. until salt-free. The resultant pigment press cake had a solids content of 28%.

In the further processing, it was possible to liquefy the 28% strength pigment press cake by means of a dissolver, after cooling down to 23° C., and then to dry it into powder form by spray-drying.

Comparative example:

The example was repeated, except that no surfactant was added, and the result obtained was a solids content in the press cake of 18%.

EXAMPLE 5

Coupling was used to prepare a dye suspension of 800 parts of C.I. Disperse Yellow 227 in a coupling volume of 22,000 parts. To this suspension were added at 22° C. 80 parts of benzyl-p-phenylphenol polyglycol ether having a cloud point in the mother liquor of 60°–62° C., and the mixture was thoroughly stirred. The temperature was then raised to 85° C. while stirring, and at this temperature the dye was isolated via a filter press. It was then washed with hot water at 70°–75° C. until neutral and salt-free and was blown dry with air in the course of 10 minutes. The resultant dye press cake had a solids content of 41.4%.

Comparative example:

The example was repeated without addition of the surfactant. The result obtained was a press cake having a solids content of 23.7%.

EXAMPLE 6

In the synthesis of 4-amino-3-nitrobenzoic acid from 4-chloro-3-nitrobenzoic acid and ammonia, the product obtained after the precipitation with sulfuric acid at pH 2-3 was a suspension of 42.4 parts of 4-amino-3-nitrobenzoic acid (BET specific surface area: 14.5 m$^2$/g) in a reaction volume of 647 parts. To this suspension were added at a temperature of 23° C. 5.3 parts of a $C_{12}$–$C_{15}$-fatty alcohol/ethylene oxide/propylene oxide adduct having a cloud point in water of 40°–42° C., and the mixture was heated with stirring to a temperature of 80° C. The solid was then isolated at this temperature via a hot nutsche filter and was washed with hot water at 60° C. until neutral and salt-free. The resultant press cake of 4-amino-3-nitrobenzoic acid had a solids content of 41.9%.

Comparative example:

The example was repeated without the addition of surfactant. The result obtained was a press cake having a solids content of 18.3%.

EXAMPLE 7

Coupling was used to prepare a suspension of 1500 parts of C.I. Pigment Yellow 83, C.I. No. 21108 (BET specific surface area: 69 m$^2$/g), in a coupling volume of 24,875 parts. To this pigment suspension were added at 24° C. 187.5 parts of a tributylphenol polyglycol ether having a cloud point in water of 62°–64° C., and the mixture was thoroughly stirred. The temperature was then raised with stirring to 85° C., and at this temperature the pigment was isolated via a filter press. It was then washed with hot water at 70°–75° C. until salt-free and was blown dry with air in the course of 10 minutes. The resultant pigment press cake had a solids content of 41%.

Comparative example:

The example was repeated without addition of surfactant. The result obtained was a pigment press cake having a solids content of 25.3%.

EXAMPLE 8

315 parts of press cake of C.I. Pigment Yellow 151 (BET specific surface area: 17.5 m$^2$/g) having a solids content of 31.7% were suspended with a dissolver in sufficient water to produce a 5% strength homogeneous pigment suspension. To this pigment suspension were added at a temperature of 23° C. 5 parts of a $C_{12}$–$C_{15}$-fatty alcohol/ethylene oxide/propylene oxide adduct having a cloud point in water of 40°–42° C., and the mixture was stirred for ½ hour. The temperature was then raised with stirring to 80°–85° C., and at this temperature the pigment was then isolated via a hot nutsche filter. The resultant pigment press cake had a solids content of 50.9%.

EXAMPLE 9

276.2 parts of press cake of C.I. Pigment Orange 36, C.I. No. 11780 (BET specific surface area: 20 m$^2$/g), having a solids content of 36.2% were suspended with a dissolver in sufficient water to produce a 5% strength homogeneous pigment suspension. To this pigment suspension were added at a temperature of 22° C. 5 parts of 2-[2-(8-heptadecen-1-yl)-4,5-dihydro-1-imidazolyl]-ethanol/ethylene oxide/propylene oxide adduct having a cloud point in water of 32°–34° C., and the mixture was stirred for ½ hour. The temperature was then raised with stirring to 80°–85° C., and at this temperature the pigment was then isolated via a hot nutsche filter. The resultant pigment press cake had a solids content of 54.5%.

EXAMPLE 10

Coupling was used to prepare a suspension of 1500 parts of C.I. Pigment Red 112, C.I. No. 12370 (BET specific surface area: 37 m$^2$/g), in a coupling volume of 40,000 parts. To this pigment suspension were added at 22° C. 180 parts of a $C_{12}$–$C_{15}$-fatty alcohol/ethylene oxide/propylene oxide adduct having a cloud point in water of 28°–30° C., and the mixture was thoroughly stirred. The temperature was then raised with stirring to 80° C., and at this temperature the pigment was isolated via a filter press. It was then washed with hot water at 55°–60° C. until neutral and salt-free and was blown dry in air in the course of 10 minutes. The resultant pigment press cake had a solids content of 39.7%.

Comparative example:

The example was repeated without the addition of surfactant. The result obtained was a pigment press cake having a solids content of 22.5%.

EXAMPLE 11

315.5 parts of press cake of C.I. Pigment Yellow 151 having a solids content of 31.7% were suspended with a dissolver in sufficient water to produce a 5% strength homogeneous pigment suspension. To this pigment suspension were added at a temperature of 15° C. 3 parts of a $C_{10}$-fatty alcohol/ethylene oxide/propylene oxide adduct having a cloud point in water of 18°–20° C. and 3 parts of a natural resin acid/ethylene oxide adduct having a cloud point in water of 39°–41° C., and the mixture was stirred for ½ hour. The temperature was then raised with stirring to 80° C., and at this temperature the pigment was then isolated via a hot nutsche filter. The resultant pigment press cake had a solids content of 51.8%.

EXAMPLE 12

315.5 parts of press cake of C.I. Pigment Yellow 151 (BET specific surface area: 17.5 m$^2$/g) having a solids content of 31.7% were suspended with a dissolver in sufficient water to produce a 5% strength homogeneous pigment suspension. To this pigment suspension were added at a temperature of 22° C. 4 parts of a $C_{12}$–$C_{15}$-fatty alcohol/ethylene oxide/propylene oxide adduct having a cloud point in water of 40°–42° C. and 2 parts of a coco fatty amine polyglycol ether having a cloud point in water of 62°–64° C., and the mixture was stirred for ½ hour. The temperature was then raised with stirring to 80°–85° C., and at this temperature the pigment was then isolated via a hot nutsche filter. The resultant pigment press cake had a solids content of 50.1%.

EXAMPLE 13

A suspension of 100 parts of C.I. Pigment Violet 19, C.I. No. 46500 (BET specific surface area: 34 m$^2$/g), in 1900 parts of water had added to it at 22° C. 8 parts of a nonylphenol polyglycol ether having a cloud point in water of 32°–34° C., and the mixture was thoroughly stirred. The temperature was then raised with stirring to 80° C., and at this temperature the pigment was isolated via a hot nutsche filter. The resultant press cake had a solids content of 42.5%.

Comparative example:

The example was repeated without addition of surfactant. The result obtained was a pigment press cake having a solids content of 26.4%.

We claim:

1. A process for preparing a highly concentrated aqueous press cake of a water-insoluble or sparingly water-soluble organic dye or pigment, which comprises preparing an aqueous suspension of the organic solid containing 0.5 to 15 mg per square meter of surface area of the organic dye or pigment of one or more nonionic surfactants having a cloud point in water, within the range of 5° to 90° C., said suspension being at a temperature below said cloud point, and isolating the organic solid at a temperature above the cloud point of the surfactant or surfactants used.

2. The process as claimed in claim 1, wherein initially the surfactant-containing suspension of the solid is prepared from its aqueous solution in the presence of the surfactant or the surfactant mixture.

3. The process as claimed in claim 1, wherein the "solid" is an azo dye or an azo pigment and the surfactant is added to the coupling suspension after the azo coupling.

4. The process as claimed in claim 1, wherein the nonionic surfactant or surfactant mixture has a cloud point in water between 20° and 70° C.

5. The process as claimed in claim 1, wherein 1 to 6 mg of surfactant is used per square meter of surface area of the dye or pigment.

6. The process as claimed in claim 1, wherein the nonionic surfactants used are block polymers of ethylene oxide and propylene oxide.

7. The process as claimed in claim 1, wherein the nonionic surfactants used are oxyalkylates of aliphatic hydroxy or amino compounds.

8. The process as claimed in claim 1, wherein the nonionic surfactants used are oxyalkylates or aromatic, cycloaliphatic or heterocyclic hydroxy or amino compounds.

9. The process as claimed in claim 1, wherein the press cake obtained above the cloud point is liquefied below the cloud point through the action of shearing forces.

10. The process as claimed in claim 2, wherein the nonionic surfactant or surfactant mixture has a cloud point in water between 20° and 70° C.

11. The process as claimed in claim 2, wherein 1 to 6 mg of surfactant is used per square meter of the surface area of the dye or pigment.

12. The process as claimed in claim 11, wherein the surfactant or the surfactant mixture has a cloud point in water between 20° and 70° C.

13. The process as claimed in claim 10, wherein 1 to 6 mg of surfactant is used per square meter of surface area of the dye or pigment.

14. The process which comprises:
preparing an aqueous suspension of a azo dye or azo pigment, said aqueous suspension containing a nonionic surfactant having a cloud point in water within the range of 5° to 90° C., said suspension being at a temperature below said cloud point;
isolating the azo dye or azo pigment in the form of a press cake having a solids content of at least about 30%, said isolating step being carried out at a temperature above said cloud point.

15. The process as claimed in claim 1, wherein the press cake thus obtained is cooled to a temperature below said cloud point and then liquefied through the action of shearing forces.

* * * * *